United States Patent [19]

Parant

[11] 4,409,292
[45] Oct. 11, 1983

[54] VITREOUS MATERIAL AND SEMICONDUCTOR COMPONENT INCORPORATING SAME

[75] Inventor: Jean-Paul Parant, Arpajon, France

[73] Assignee: Societe Anonyme dite Compagnie General d'Electricite, Arpajon, France

[21] Appl. No.: 396,950

[22] Filed: Jul. 9, 1982

[30] Foreign Application Priority Data

Jul. 9, 1981 [FR] France .............................. 81 13497

[51] Int. Cl.³ ................................................. B32B 9/04
[52] U.S. Cl. ..................................... 428/428; 252/518; 252/520; 428/426; 428/446; 501/76
[58] Field of Search .................. 501/76; 428/446; 252/518, 520

[56] References Cited

U.S. PATENT DOCUMENTS

| | | | |
|---|---|---|---|
| 3,005,722 | 10/1961 | Cerulli | 65/43 |
| 3,207,706 | 9/1965 | Hoffman | 252/514 |
| 3,645,839 | 2/1972 | Veres | 65/36 |
| 3,684,536 | 8/1972 | Hoffman | 501/76 |
| 3,734,702 | 5/1973 | Veres | 106/54 |
| 3,950,174 | 4/1976 | Suzuki et al. | 501/76 |
| 4,133,690 | 1/1979 | Muller | 501/76 |

Primary Examiner—George F. Lesmes
Assistant Examiner—Buffalow, E. Rollins
Attorney, Agent, or Firm—Sughrue, Mion, Zinn, Macpeak and Seas

[57] ABSTRACT

A vitreous material suitable for coating a semiconductor component comprises, by weight:
30% to 40% zinc oxide ZnO,
15% to 30% lead oxide PbO,
20% to 40% boron oxide $B_2O_3$,
5% to 20% silicon dioxide $SiO_2$,
2% to 10% aluminum titanate $Al_2TiO_5$, and
0% to 5% bismuth oxide $Bi_2O_3$.

2 Claims, No Drawings

VITREOUS MATERIAL AND SEMICONDUCTOR COMPONENT INCORPORATING SAME

BACKGROUND OF THE INVENTION

1. Field of the Invention.

The present invention concerns a vitreous material and the application of this material to a semiconductor component.

2. Description of the Prior Art

A glass-based material is described in French Patent Application No. 2 028 127 published on Oct. 9, 1970 in the name of an American company. This material, which may be used for fixing two glass parts for use in the electronics industry, comprises a mixture of a setting glass with aluminum titanate, the setting glass comprising, for example, zinc oxide, lead oxide, boron oxide and silicon dioxide.

The setting compounds described in this patent application crystalize at low temperature, however, and thus cannot be used in certain applications.

The objective of the present invention is to provide a transparent vitreous material offering simultaneously good resistance to devitrification, a low coefficient of thermal expansion and a relatively low spreading temperature, so that it may be used to coat silicon parts used in the manufacture of semiconductor components.

SUMMARY OF THE INVENTION

The invention consists in a vitreous material comprising zinc oxide ZnO, lead oxide PbO, boron oxide $B_2O_3$, silicon dioxide $SiO_2$, aluminum titanate $Al_2TiO_5$ and bismuth oxide $Bi_2O_3$, in the following proportions by weight:
- 30% to 40% ZnO,
- 15% to 30% PbO,
- 20% to 40% $B_2O_3$,
- 5% to 20% $SiO_2$,
- 2% to 10% $Al_2TiO_5$, and
- 0% to 5% $Bi_2O_3$.

The invention further consists in a semiconductor component comprising a silicon part and a layer of a vitreous material adhering to an outer surface of said part, said vitreous material comprising, by weight:
- 30% to 40% zinc oxide ZnO,
- 15% to 30% lead oxide PbO,
- 20% to 40% boron oxide $B_2O_3$,
- 5% to 20% silicon dioxide $SiO_2$,
- 2% to 10% aluminum titanate $Al_2TiO_5$, and
- 0% to 5% bismuth oxide $Bi_2O_3$.

Specific embodiments of the invention will now be described by way of example only.

The vitreous material in accordance with the invention is a mixture of six oxides: zinc oxide ZnO, lead oxide PbO, boron oxide $B_2O_3$, silicon dioxide $SiO_2$, aluminum titanate $Al_2TiO_5$ and bismuth oxide $Bi_2O_3$. The proportion by weight of each oxide in the mixture may vary between a minium and a maximum value as indicated in the table over:

TABLE I

| Oxide | % by weight Min | % by weight Max |
|---|---|---|
| ZnO | 30 | 40 |
| PbO | 15 | 30 |
| $B_2O_3$ | 20 | 40 |
| $SiO_2$ | 5 | 20 |
| $Al_2TiO_5$ | 2 | 10 |
| $Bi_2O_3$ | 0 | 5 |

TABLE I-continued

These oxides are mixed in powder form in a platinum crucible which is heated for approximately three hours to melt the mixture, this occurring at a temperature of 100° C. The mixture is mechanically agitated while melting so as to accelerate the elimination of bubbles and the liquefaction of non-melted parts. The resulting homogeneous liquid bath is then cooled in a graphite mold. The solidified material is then annealed, after which samples may be cut to determine the properties of the vitreous material obtained.

This material offers good resistance to devitrification, a coefficient of linear expansion of the order of $5 \times 10^{-6}$/°C. and a spreading temperature less than or equal to 650° C. The spreading temperature is the temperature at which a sample of glass placed on a substrate commences to spread over the substrate.

It is possible to use this vitreous material as a protective coating on the outside surface of a silicon part to be used in the manufacture of a semiconductor component such as a photo-electric solar cell. By melting a sample of the vitreous material placed on the part, a transparent layer adhering to the external surface of the part is formed.

By virtue of the low spreading temperature of the material, depositing this layer does not involve any risk of damaging the p-n junctions of the silicon part. Also, the low coefficient of expansion of the vitreous material in accordance with the invention provides for reducing the mechanical stresses between the silicon substrate and the glass deposit. This avoids the cracking of the layer observed when using a prior art glass.

The glass layer is stable when exposed to ultra violet radiation, an important advantage in the case of a solar cell, unlike certain coatings based on organic compounds.

The layer deposited also provides good protection of the silicon against atmospheric contamination and mechanical shock.

By way of a specific example, samples of a glass with the following composition were prepared:

TABLE II

| Oxide | % by weight |
|---|---|
| ZnO | 35 |
| PbO | 25 |
| $B_2O_3$ | 25 |
| $SiO_2$ | 10 |
| $Al_2TiO_5$ | 5 |

Measurements carried out on these samples gave the following results:
- average coefficient of expansion between 20° and 300° C.: $5.2 \times 10^{-6}$/°C.,
- spreading temperature: 650° C.,
- transformation temperature: 510° C.,
- resistance to devitrification: good—the glass remained transparent after four consecutive heat cycles each comprising an increase in temperature to 650° C., one quarter-hour at 650° C. and a reduction in temperature to ambient temperature,
- resistance to ultra violet radiation and moisture: good, optical transmission in the visible spectrum: very good.

I claim:

1. A vitreous material comprising ZnO, PbO, $B_2O_3$, $SiO_2$, $Al_2TiO_5$ and $Bi_2O_3$, in the following proportions by weight:
   30% to 40% ZnO,
   15% to 30% PbO,
   20% to 40% $B_2O_3$,
   5% to 20% $SiO_2$,
   2% to 10% $Al_2TiO_5$, and
   0% to 5% $Bi_2O_3$.

2. A semiconductor component comprising a silicon part and a layer of a vitreous material adhering to an outer surface of said part, said vitreous material comprising, by weight:
   30% to 40% zinc oxide ZnO,
   15% to 30% lead oxide PbO,
   20% to 40% boron oxide $B_2O_3$,
   5% to 20% silicon dioxide $SiO_2$,
   2% to 10% aluminum titanate $Al_2TiO_5$, and
   0% to 5% bismuth oxide $Bi_2O_3$.

* * * * *